July 20, 1943.  H. J. LOVE  2,324,938
METHOD AND MECHANISM FOR RECOVERING METAL
Filed Aug. 17, 1942  6 Sheets-Sheet 1
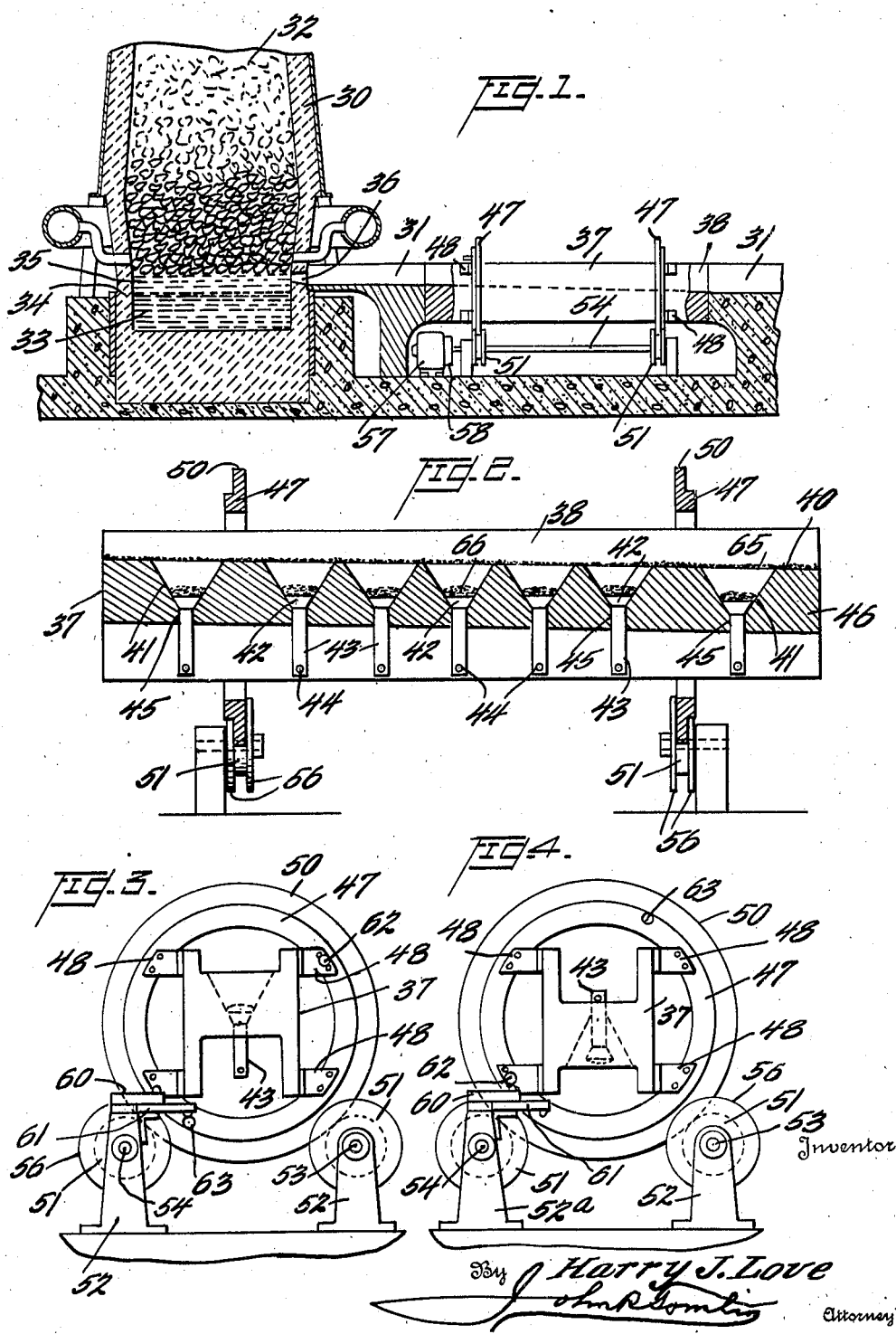

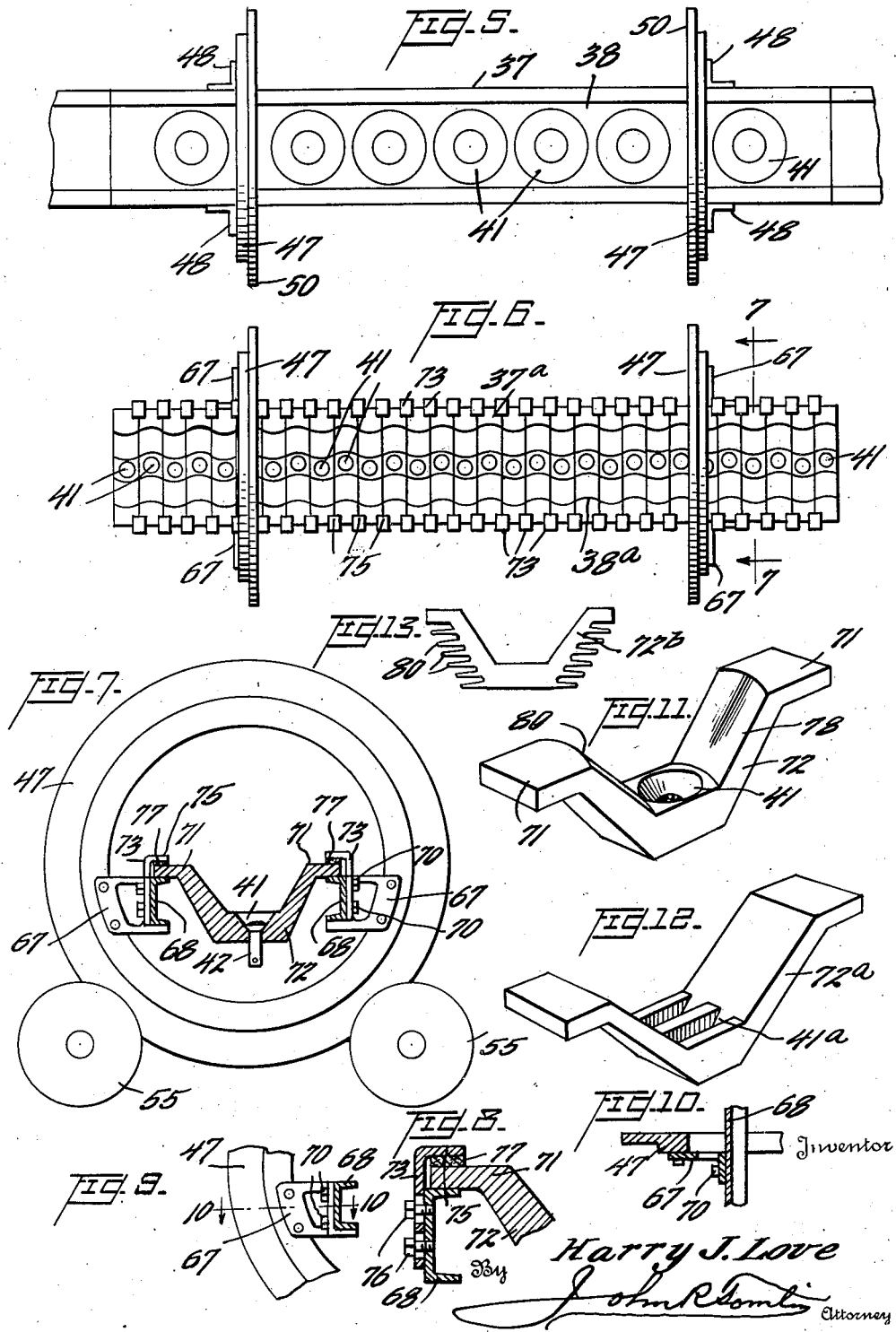

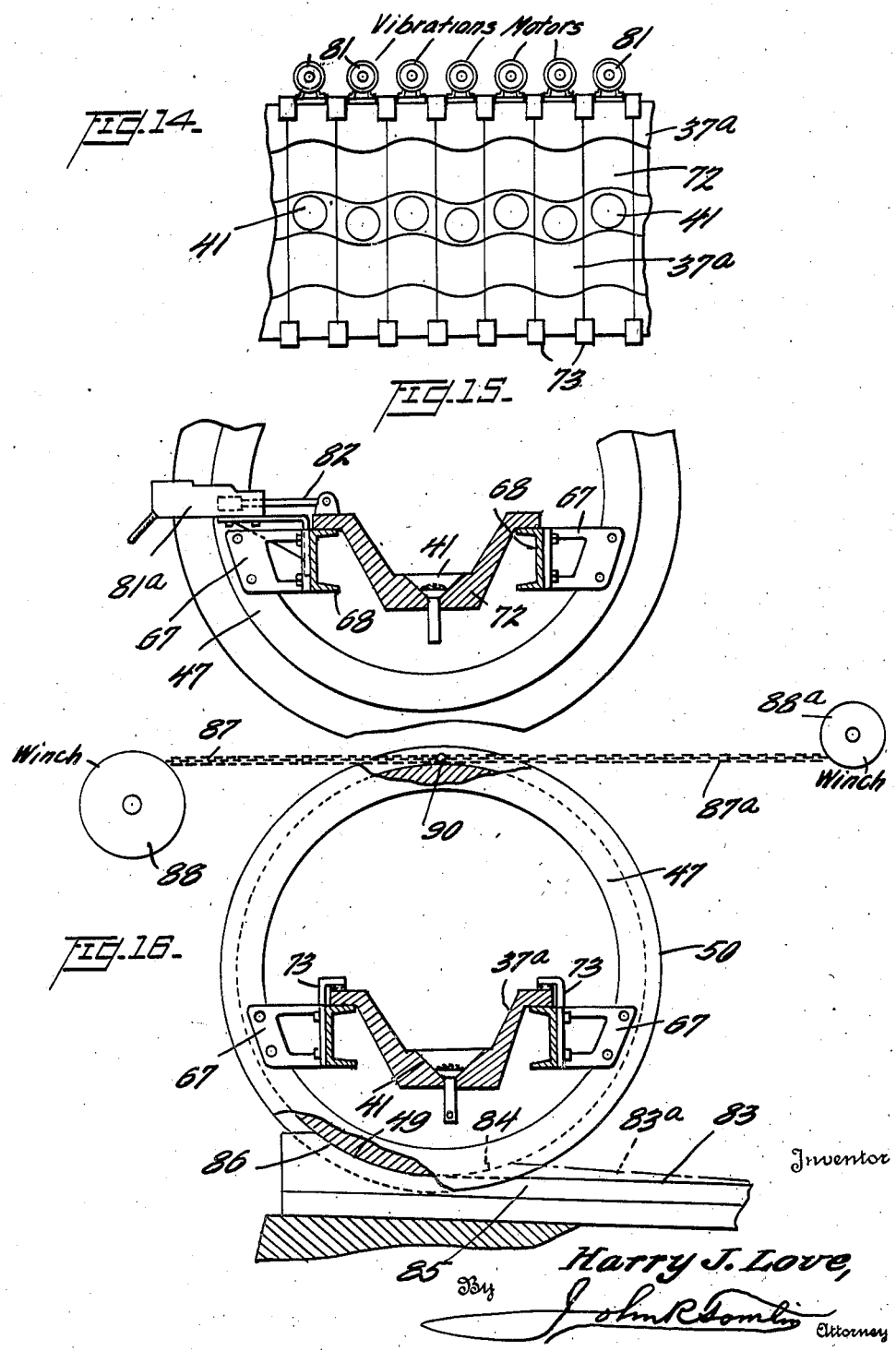

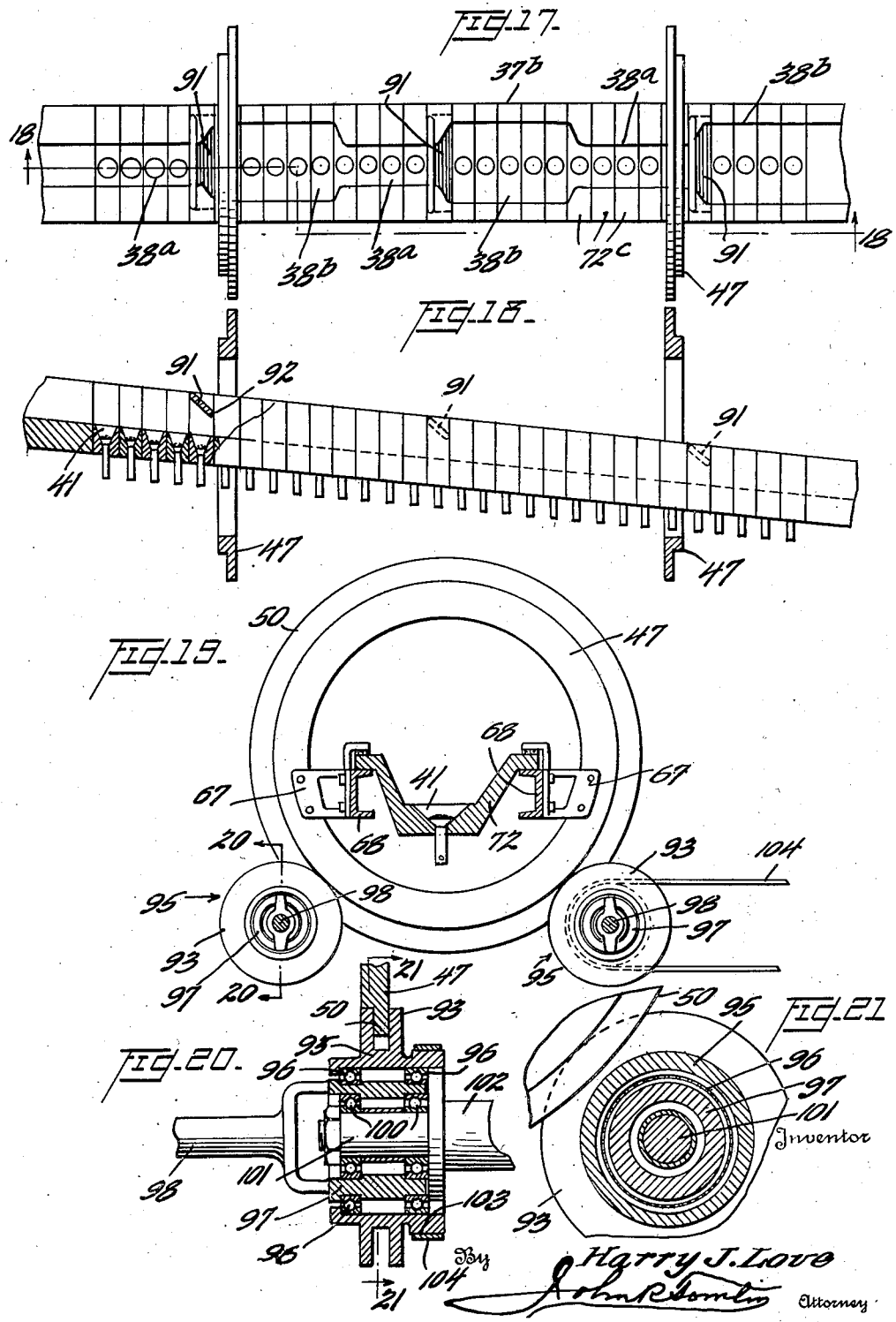

July 20, 1943.  H. J. LOVE  2,324,938
METHOD AND MECHANISM FOR RECOVERING METAL
Filed Aug. 17, 1942   6 Sheets-Sheet 5
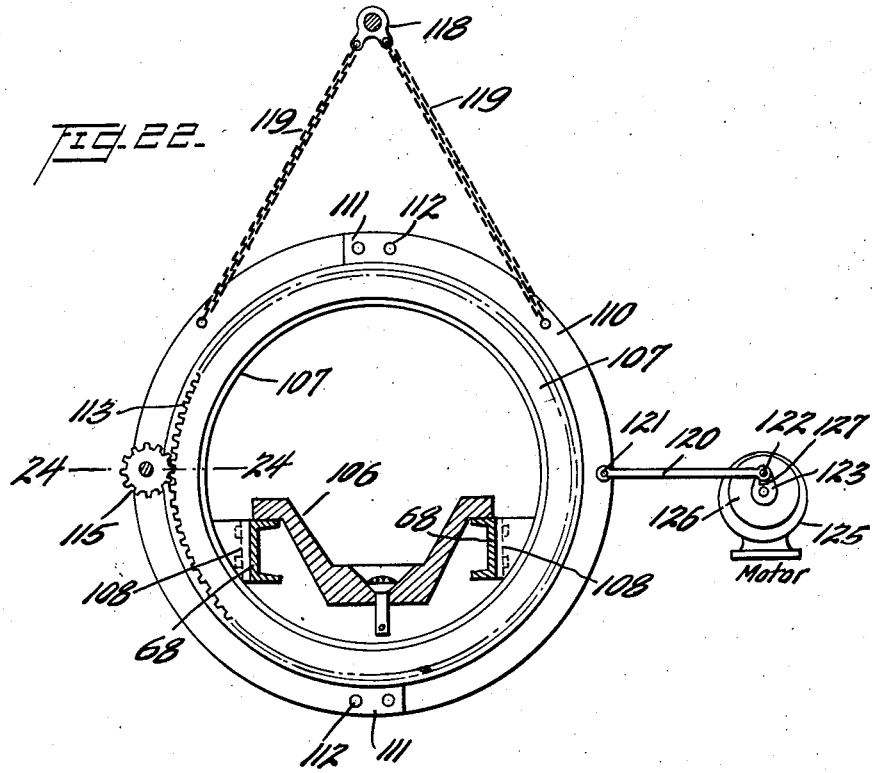
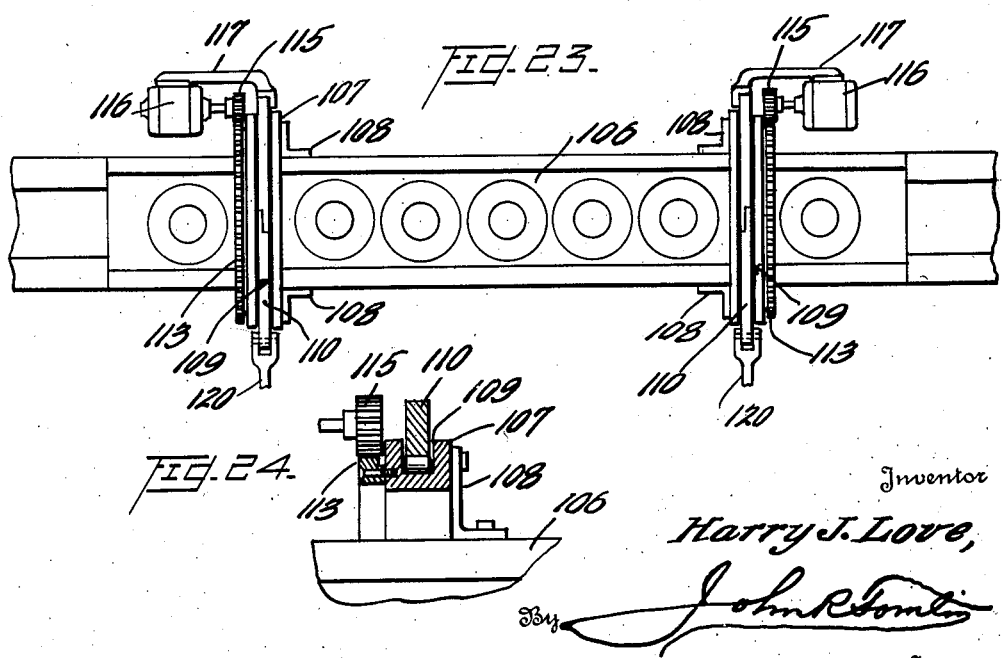
Inventor
Harry J. Love,
By John R. ____
Attorney

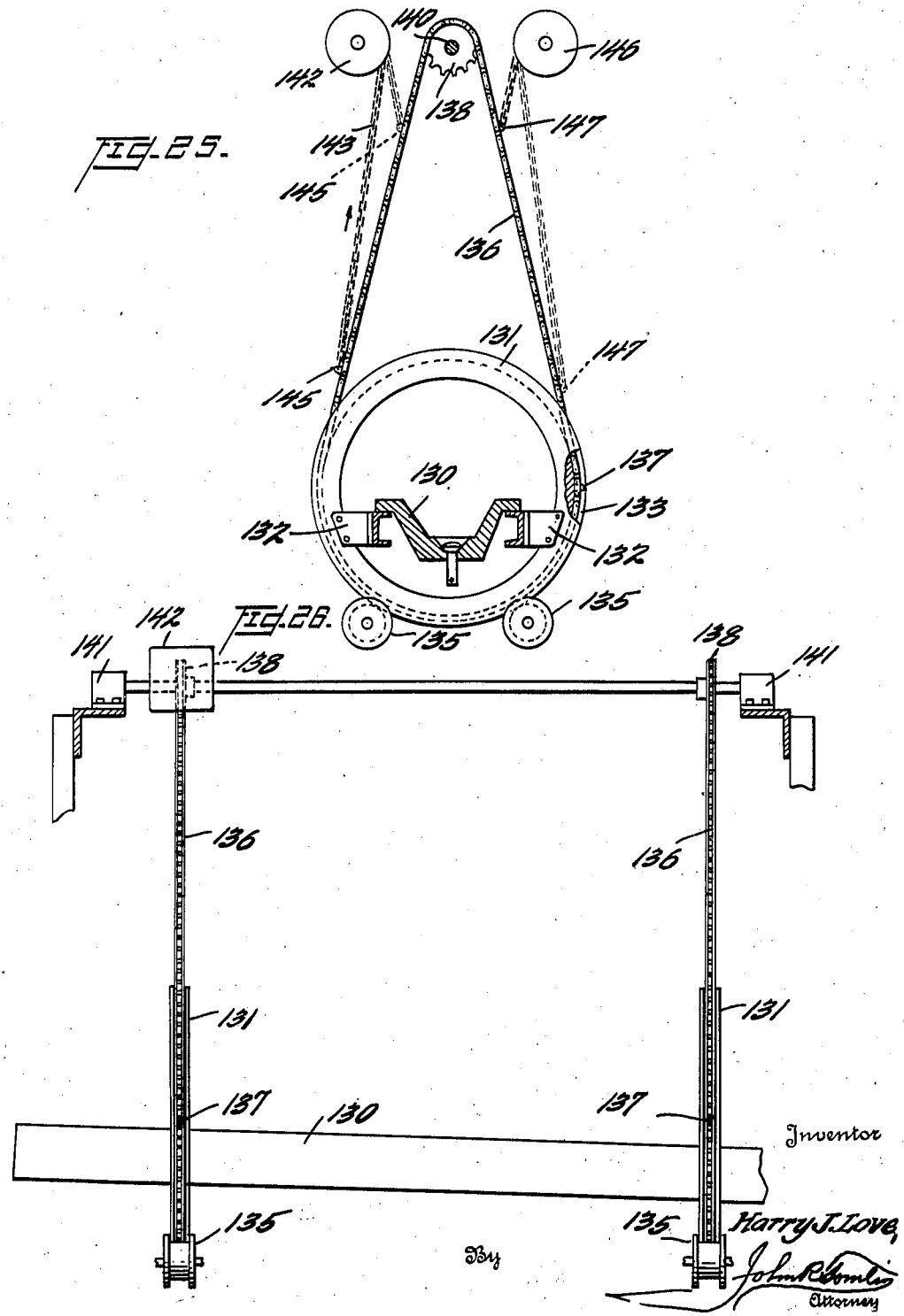

Patented July 20, 1943

2,324,938

UNITED STATES PATENT OFFICE 2,324,938

METHOD AND MECHANISM FOR RECOVERING METAL

Harry Joseph Love, Washington, D. C.

Application August 17, 1942, Serial No. 455,097

27 Claims. (Cl. 75—24)

This invention relates to the separation or recovery of metal from molten slag, and more particularly to method and means for separating and recovering iron which is entrained in a stream of molten slag that is discharged or tapped from a blast furnace.

In the operation of modern blast furnaces, the usual material or stock is fed or charged into the top of the furnace, and it then gravitates therein to the usual zone of combustion where the combustion is promoted by air blasts or drafts. As the stock gravitates in the furnace, it is subjected to many changes, and finally upon combustion molten slag and iron are produced. The molten iron trickles down into the hearth of the furnace and collects at the bottom thereof, while the lighter slag accumulates thereabove. The molten iron is tapped from the furnace at given intervals, and the slag at more frequent intervals. The molten slag is discharged from the furnace through a slag notch onto a slag runner or trough which conveys the slag to a given destination.

This slag, however, still contains an appreciable quantity of iron, therefore a specific object of my invention is to provide method and means for separating the iron from the slag to recover it for subsequent use.

Another object of my invention is to provide method and means for recovering metal from molten slag, which includes positioning a novel slag runner or trough in the path of travel of the molten slag and entrained metal as it flows from the furnace.

A further object of this invention is to provide a metal-recovery runner which is constructed and arranged to recover the metal that is entrained in molten slag which flows through the runner, and then discharge the recovered metal from the runner.

An additional object of this invention is to provide a metal-recovery runner which is constructed and arranged to recover metal that is entrained in molten slag which flows through the runner, the runner being movable to discharge the recovered metal therefrom.

Another object of this invention is to provide a metal-recovery runner which is constructed and arranged to recover metal that is entrained in molten slag which flows through the runner, the runner being movable to discharging position and incorporating means for ejecting the solidified metal therefrom.

Another object of this invention is to provide a metal-recovery runner over which molten slag from a blast furnace is directed, the runner being constructed and arranged to frequently change the direction of flow of the fluid mass in order that the entrained iron, which is of greater specific gravity than molten slag, may gravitate to pockets formed in a runner.

Another object of this invention is to provide a metal-recovery runner over which molten slag from a blast furnace is directed, the runner being vibrated at any desired frequency to cause the entrained metal in the slag to gravitate into pockets or receptacles formed therein for its reception, the vibratory movement of the runner or sections thereof being made through any required amplitude and in any preferred direction.

Another object of this invention is to provide a metal-recovery runner over which molten slag is directed, the runner being constructed and arranged to cause the flowing fluid slag to pass through the runner at different fluid depths whereby the metal entrained in the fluid slag is deposited by gravity into pockets or receptacles formed in the runner for its reception.

Another object of this invention is to provide a metal-recovery runner over which molten slag is directed, the runner being suspended for swinging movement, which movement agitates the fluid mass and also introduces a centrifugal component which tends to assist the action of gravity in separating the entrained iron from the fluid slag and depositing it in pockets located below the flowing slag.

Another object of this invention is to provide a metal-recovery runner through which molten slag is directed, the runner being formed of a plurality of interchangeable sections which are united to provide a composite structure.

Another object of this invention is to provide a metal-rocevery runner through which molten slag is directed, the runner being formed of a plurality of interchangeable sections that are united to provide a composite slag directing trough having metal-receiving pockets therebelow, the runner being movably supported in a cradle in order to discharge recovered metal therefrom.

It is also an object of this invention to provide a slag runner of generally improved construction, whereby the device will be simple, durable, and inexpensive in construction, as well as convenient, practical, serviceable and efficient in its use.

With the foregoing and other objects in view, which will appear as the description proceeds, the invention resides in the combination and arrangement of parts, and in the details of construction hereinafter described and claimed, it being understood that various changes in form, proportion and minor details of construction may be made within the scope of the claims without departing from the spirit or sacrificing any advantages of the invention.

For a complete disclosure of the invention, a detailed description thereof will now be given in connection with the accompanying drawings forming a part of the specification, wherein:

Figure 1 is a vertical sectional view taken through a conventional blast furnace and slag conveying trough and having my improved slag runner applied thereto, parts of the slag runner being shown in elevation.

Figure 2 is an enlarged vertical sectional view taken through the slag runner and supports.

Figure 3 is an end elevation of the slag runner.

Figure 4 is a similar view, but showing the slag runner in its inverted or discharging position.

Figure 5 is a fragmental plan view of the improved slag runner and conventional slag trough.

Figure 6 is a plan view of a modified slag runner.

Figure 7 is a sectional view taken on the line 7—7 of Figure 6.

Figure 8 is an enlarged fragmental sectional view depicting the support for a slag runner component or section.

Figure 9 is a fragmental elevation depicting the bracket for uniting components of the slag runner support.

Figure 10 is a fragmental horizontal sectional view taken on the line 10—10 of Figure 9.

Figure 11 is a perspective view of a slag runner section or component employed in the form or runner disclosed in Figure 6.

Figure 12 is a similar view of a modified runner component.

Figure 13 is an end view of a slag runner component having cooling fins.

Figure 14 is a fragmental plan view of the type of slag runner depicted in Figure 6, but showing vibrating motors applied to the runner sections.

Figure 15 is a fragmental vertical sectional view taken through a supported slag runner component and having a modified vibrator operably secured thereto.

Figure 16 is a vertical sectional view taken through a supported slag runner component and depicting means for rolling the runner support along a guide or trackway.

Figure 17 is a plan view of a modified slag runner.

Figure 18 is a vertical longitudinal sectional view taken on the line 18—18 of Figure 17.

Figure 19 is a vertical sectional view taken through a supported slag runner component and depicting a modified vibrator applied to the support.

Figure 20 is a vertical longitudinal sectional view taken through the modified vibrator on the line 20—20 of Figure 19.

Figure 21 is a vertical transverse sectional view taken on the line 21—21 of Figure 20.

Figure 22 is a vertical sectional view taken through a modified slag runner and support, and showing means for swinging or vibrating the slag runner.

Figure 23 is a plan view of the slag runner depicted in Figure 22.

Figure 24 is a detailed sectional view taken on the line 24—24 of Figure 22.

Figure 25 is a vertical sectional view taken through a suspended slag runner and support showing modified means for rotating the slag runner about the axis of its support; and Figure 26 is a side elevation of the slag runner construction depicted in Figure 25.

Referring to the drawings, in which similar reference characters designate corresponding parts, 30 indicates a conventional blast furnace having an inclined slag trough 31 extending therefrom. The furnace contains the usual material or stock 32 from which molten iron is produced, and this stock is subjected to high temperatures which result in the production of molten iron and slag. The iron 33 collecting in a pool in the bottom of the hearth 34 of the furnace, and the slag 35 accumulates thereabove. While the molten iron 33 and molten slag 35 are, for the most part, separated in the hearth of the furnace and form separate strata at the different heights in the hearth of the furnace, the slag still contains some iron, and unless this iron is separated from the slag it is carried to the slag piles or other destinations.

The molten iron is tapped from the furnace at given intervals and the slag at more frequent intervals. The molten slag passes from the hearth of the furnace through a slag notch or hole 36 and flows along the slag trough 31 to any preferred destination or destinations, well known to those skilled in the art. Owing to the influence of the usual flux, the molten slag is in mobile fluid condition as it leaves the blast furnace.

In order to recover the iron or metal entrained in this slag I have provided a novel slag runner, and a preferred embodiment of my invention is depicted in Figures 1 to 5. The runner 37 is provided with an inclined runway or channel 38 which extends longitudinally throughout its length and aligns with the inclined slag trough 31, to thus provide a continuous inclined trough or runway for the flowing slag. This runner is formed of any suitable material, such as steel, and it has formed in its bottom 40 below the channel 38 a plurality of frusto-conical metal-receiving pockets or recesses 41. Each pocket 41 receives in the lower portion thereof a frusto-conical ejector 42 having a cylindrical stem 43 secured thereto and which extends through a cylindrical aperture 45 formed in the body 46 of the slag runner 37.

The slag runner 37 has a supporting ring or annulus 47 secured thereto adjacent each terminal by suitable securing brackets 48, so that the runner and supporting rings 47 form a unitary structure. The outer peripheral portion of each ring 47 is reduced to define an annular track or rail 50 which engages and is supported by spaced flanged rollers 51. These rollers are rotatably secured to supports 52 at one side of the runner 37 by stub shafts 53, and at the outer side of the runner to supports 52a by a longitudinally-extending shaft 54. The spaced complementary flanges 56 of each roller engage the annular track 50 of the slag runner 37 to thereby rotatably support the slag runner 37, and to also support the slag runner 37 and its supporting rings 47 against longitudinal movement.

The rotatable slag runner may be rotated in any preferred manner, either manually or by power suitably imparted to the runner. A preferred arrangement is one in which an electric motor 57 (Figure 1) is operably connected to the shaft 54 through an interposed conventional speed reducer 58. This motor is placed in an electric circuit that may be controlled by any conventional electric switch, not shown, and the rotational movement of the runner is limited by conventional limit switches 60 and 61 connected in the electric circuit, not shown, and placed in the path of travel of pins 62 and 63 carried by the slag runner support 47.

By this arrangement, the electric motor 57 drives the shaft 54 and rollers 51 through the speed reducer 58. The rotation of the rollers 51 rotates the supporting rings 47 and slag runner 37 about the axis of the supporting rings 47. This rotational movement is initiated by manipulating the conventional push button switch, not shown, but the amplitude of rotational movement of the rings 47 is limited by the stop pins 62 and 63 engaging the conventional limit switches 60 and 61. When the stop pin 63 engages the limit switch 61, the slag runner is stopped in slag conveying relation to the slag trough 31, as shown in Figures 1 and 3, and when the stop pin 62 engages the limit switch 60, the slag runner is stopped in dumping or discharging position, as shown in Figure 4, said positions being preferably located 180 degrees apart.

In the operation of this form of my invention, the molten slag with its entrained metal is discharged from the blast furnace 30 through the slag notch 36 onto the inclined slag trough 31. The molten slag flows along the slag trough 31 and then through the channel 38 of the slag runner 37 over the metal-receiving pockets 41. As the molten slag flows along the channel 38 of the slag runner, the relatively heavy particles of metal entrained in the slag gravitates into the pockets, and the lighter slag passes along the channel 38 and slag trough 31 to its destination. After the requisite quantity of slag has been tapped from the furnace, the slag flow is discontinued, in the usual manner, and the slag in the runner is conveyed to its destination, and the recovered metal is trapped in the pockets 41. After the metal solidifies in the pockets 41, the electric circuit to the motor 57 is established to rotate the runner 37 about the axes of the supporting rings 47 through an angle of 180 degrees to dumping or discharging position. In this position the solidified metal pigs in the pockets 41 probably gravitate from the slag runner 37, but if any of these pigs should adhere to the pockets, they are readily ejected by striking the stems 43 of the ejectors 42, to thus forceably eject the metal pigs. The downward movement of the ejectors in their inverted or discharged position is limited by pins 44.

Inasmuch as the molten slag flows from the furnace along the trough 31 and through the slag runner 37 at very high temperature, the channel 38 of the slag runner is preferably coated with an insulating or protective material 65, such as clay composition or the like, and the upper terminals of the frusto-conical ejectors are also similarly protected by deposits 66 of similar protective material. This protective material aids in insulating the slag runner and its components against the high temperatures of the flowing slag and also aids in preventing the slag and trapped metal from adhering to the slag runner 38, pockets 41, and ejectors 42.

With this arrangement, the metal recovery slag runner 37 may be readily assembled in operable relation to the usual slag conveyor or runner to trap the metal entrained in the fluid slag as it flows over the slag runners, and the entrapped metal may be readily ejected from the runner by simply rotating the runner and striking the ejectors.

In Figures 6 to 11, a modified composite slag runner is depicted which includes the supporting rings 47 that have brackets 67 secured thereto, as best seen in Figures 7, 9 and 10, and each bracket is secured to a channel member or support 68 by bolts 70, or other suitable securing devices. The channels 68 are secured by the brackets 67 to each side of the supporting rings 47 in position to engage supporting flanges 71 formed on U-shaped runner components or sections 72, and each component section 72 has a frusto-conical metal-receiving pocket 41 formed therein. The flanges 71 of the runner components 72 engage a flange of each channel member 68 in abutting relation, so that a plurality of these runner components 72 are united to form a composite slag runner 37a. L-shaped clamp members 73 are secured to the outer faces of the channel members 68 by bolts 76, or other securing devices, as best seen in Figure 8, and these clamp members 73 are provided with terminal flanges 75 and they are located at each side of the supporting rings 47 and positioned to engage the abutting edges of the supporting flange 71 of the runner components 72, as best seen in Figure 6. By this arrangement, the terminal flange 75 of each L-shaped clamp member 73 overhangs the abutting edges of a pair of adjacent runner components 72, in order to secure or clamp the supporting flanges 71 of the runner components 72 to the channel members 68. An insulating pad or cushion 77, formed of asbestos or other suitable material, is preferably interposing between each clamp flange 75 and the supporting flange 71 of each runner component 72, to thus protect the structure against expansion and contraction caused by the high temperatures to which it is subjected.

The runner components 72 are of identical construction and configuration, but they are assembled in opposition or in staggered relation in order to provide a sinuous channel 38a in the composite slag runner 37a. To accomplish this, the side wall or leg 78 formed at one side of a channel component 72 is of concave configuration, as best seen in Figure 11, and the opposed side wall or leg 80 is of convex configuration. The axis of the frusto-conical metal-receiving pocket 41 of each runner component is located at one side of the midpoint between the outer terminals of the flanges 71 of each runner component 72, so that when the components are assembled on the channel member 68 in abutting relation with immediately adjacent components disposed in reverse relation, the metal-receiving pockets are located at opposite sides of a vertical plane which passes longitudinally through the midpoint of the assembled runner components.

By this arrangement, the runner sections 72 combine to provide a rigid composite runner 37a which is supported on the rollers 55, in a manner hereinbefore disclosed, and the relationship of the adjacent components 72 provides a constantly reversing sinuous channel 38a which extends longitudinally through the composite runner 37a. As the molten slag flows through the sinuous channel 38a, the direction of flow of the fluid mass is constantly reversed or changed to thereby aid in causing the relatively heavy entrained metal particles in the molten slag to gravitate into the metal-receiving pockets 41, so that the maximum quantity of entrained metal is separated from the fluid slag.

The composite slag runner 37a is rotated about the axis of its supporting rings 47 on the rollers 55, in a manner hereinbefore disclosed, in order to rotate the runner from slag conveying position to metal ejecting position, and the solidified metal pigs in the metal-receiving pockets 41 are ejected either by gravity or by the ejectors 42, hereinbefore described.

In Figure 12 a modified form of runner component 72a is depicted, and this runner component or section is similar to the runner component 72 except that rectangular or pyramidal metal-receiving pockets 41a are formed therein. These runner components are assembled on the supporting channels 68 in the manner hereinbefore disclosed.

In Figure 13 a runner component 72b, similar to that disclosed in Figures 11 and 12, is disclosed, but this component is provided with cooling fins 80 in order to facilitate the cooling of the slag runner.

Figure 14 discloses a composite slag runner 37a, similar to that hereinbefore disclosed, but each runner section 72 has a conventional vibrating motor 81 suitably secured thereto or connected therewith, so that upon actuation of a motor 81 each section is independently vibrated in order to facilitate gravitational movement of the relatively heavy entrained metal particles of the flowing molten slag into the metal-receiving pockets 41. In the arrangement depicted, a separate rotary vibratory motor is secured to or connected with each runner component 72, but, if preferred, a motor 81 may be provided for a group of runner components consisting of any preferred number of components. Although the amplitude or vibratory movement of each section 72 relative to the adjacent section is relatively small, there may be a tendency for the fluid slag to escape through the joints between adjacent runner section 72, and in order to prevent this the entire slag conveying channel of the composite runner 37a is coated with a protective material, such as a clay composition, and this protective material is also placed between the abutting edges of the adjacent runner components.

Figure 15 depicts an arrangement similar to that disclosed in Figure 14, but instead of vibrating the runner or component sections by rotary vibratory motor, each section or each group of sections is vibrated by a conventional reciprocatory vibrator 81a, as diagrammatically depicted in this figure. Each vibrator 81a being connected to a runner component, or group thereof, through an interposed link 82. By this arrangement, each runner component, or group of components, is vibrated laterally at any desired frequency and through any preferred amplitude of reciprocatory movement. This arrangement facilitates the gravitational movement of the relatively heavy metal globules entrained in the fluid into the metal-receiving pockets.

Figure 16 depicts an arrangement in which a metal runner is mounted in supporting rings 47, which roll along inclined trackways or rails 83 that are provided with longitudinally-extending grooves 85 to receive the peripheral portions 50 of the supporting rings 47. The upward rolling movement of the rings 47 along the tracks 83 is limited by an arcuate stop surface 86 which engages an annular shoulder 49 formed between the thickened portion of the ring 47 and the reduced trackway 50.

When it is desired to discharge the entrapped metal from the metal-receiving pockets 41, the supporting rings 47 roll downwardly along the tracks 83 until the pockets are in inverted position. This rolling action is caused by releasing or permitting control chains 87 to play outwardly from winches or hoists 88 of conventional construction, a terminal of each chain being secured to a supporting ring 47 as indicated at 90. After the entrapped metal has been discharged from the pockets 41, the composite runner is moved to its original position, and this is accomplished by drawing in the chains 87 by the action of the winches 88 to thus rotate the rings 47 along the tracks 83 until the annular shoulders 49 of the rings engage the arcuate stops 86.

In order to insure that the supporting rings will be held in such position as to support the slag runner in upright or slag-receiving position, tracks 83a are provided, as indicated in dotted lines in Figure 16, each of which has a recess 84 formed therein to receive the annular shoulder 49 of each ring. By this arrangement the rings are held by gravity in their uppermost position, and in order to initiate the downward rolling movement of the rings 47 along the track 83a, a winch 88a is provided for each ring, and it has a cable or chain 87a extending therefrom and connected to a ring as indicated at 90. By simply actuating each winch 88a to draw the flexible elements 87a inwardly, the rings 47 will be rolled from engagement with the arcuate recess 84 and then down the inclined track 83a, and the downward movement of the rings 47 along the tracks 83a is controlled and limited by the winches 88.

In Figures 17 and 18 a modified form of my improved slag runner is depicted, and, in this arrangement, the separation of the entrained metal from the molten slag is facilitated by agitating the flowing molten slag both laterally and vertically as it passes along the slag runner 37b. This slag runner may be formed from a single piece of material, or it may be formed by uniting a plurality of runner components or sections, as indicated, in the manner hereinbefore disclosed, to thus provide a composite slag runner. The sections or components 72c of the composite slag runner 37b are shaped to provide successive narrow and wide channels 38a and 38b. Molten slag from the furnace flows along the slag troughs 31 into the first relatively narrow channel 38a over the metal-receiving pockets 41 until it engages a baffle plate or gate 91. At this point the channel 38a is widened into a broad channel 38b, and the width of the broad channel 38b is so chosen with relation to the narrow channel 38a that the cross sectional area of channel 38b below the lower edge 92 of the baffle 91 is the same as the cross sectional area of the channel 38a to the mesne height of the molten slag flowing therein.

After the fluid slag passes through the first relatively wide channel 38b, it then flows through the next relatively narrow channel 38, which, in turn, leads to another relatively wide channel 38b, and so on until the fluid mass has traversed the entire slag runner. By this arrangement, the mesne depth of the fluid in the relatively wide channel 38b will be less than the mesne depth of the fluid slag in the relatively narrow channel 38a. As the fluid slag reaches the first relatively wide channel 38b, at the left of the slag runner, as viewed in Figures 17 and 18, it flows under the lower edge 92 of the baffle 91, and the cross sectional area of the slag runner channel at this station equals the cross sectional area of the slag runner channel at a station in the relatively narrow channel 38a, as defined by its metal depth. This causes the fluid level in the first relatively wide channel 38b to be less than the mesne fluid level in the first relatively narrow channel 38a, and as the fluid mass emerges from the first relatively wide channel 38b into the second relatively narrow channel 38a, its mesne depth is increased somewhat, but it is again reduced when the fluid slag flows under the second baffle into the second relatively wide channel 38b, and so on until the metal flows from the inclined slag runner. In this type slag runner its inclination is somewhat greater than in the previously disclosed types, and inasmuch as the fluid mass which is permitted to flow below the lower edges 92 of the baffles 91 into the relatively wide channels 38b immediately flows away down the inclined channel runner, the depth of the fluid slag in the relatively wide channels 38b is less than the depth of the fluid slag in the relatively narrow channels 38a. As the slag flows through this runner, the entrained metal gravitates into the pockets 41, and it is discharged therefrom, as hereinbefore explained. This slag runner is also rotatably supported in the manner hereinbefore disclosed.

In Figures 19, 20 and 21, there is disclosed a modified arrangement for imparting vibratory impulses to the slag runner, or slag runner components. This runner is rotatably supported in rings 47, and the annular track portions 50 of the rings are, in turn, received between spaced complementary annular flanges 93 formed on rollers 95. The hub of each roller 95 is rotatably supported on axially-spaced anti-friction bearings 96, and these bearings, in turn, are supported on an eccentric ring or annulus 97 which is rotatably driven through a shaft 98 from a motor or other suitable drive mechanism, not shown. The eccentric ring 97 is rotatably supported on axially-spaced anti-friction bearings 100 which are carried by a spindle 101 formed in the end of a shaft or stud 102. The roller hubs which are positioned at one side of the supported slag runner are provided with pulley faces 103 around which a belt 104 is trained, and the belt may be driven by a motor, or any suitable source of power, not shown.

In operation, the driven belts 104 rotate the rollers 95 located at one side of the slag runner to thereby rotate the supporting rings 47 and the slag runner, so that the slag runner may be moved through an arc of 180 degrees from slag-receiving position to metal-discharging position. In order to facilitate the action of gravity in separating the entrained metal from the molten slag as the slag passes along the slag runner, vibratory impulses are imparted to the supporting rings 47 and slag runner by rotating each shaft 98, which, in turn, rotates the eccentric ring 97. As this ring rotates, it moves the roller 95 and its flanges 93 in radial relation to the supporting shaft 102, to thus vibrate the slag runner, and the amplitude of this vibratory movement may be determined by the degrees of eccentricity of the eccentric rings 97. If vibratory impulses of relatively high velocity are to be imparted to the slag runner, then the eccentric ring is formed with a relatively low degree of eccentricity. When vibratory impulses of relatively great amplitude are to be imparted to the slag runner, then the degree of eccentricity of the eccentric ring 97 is increased, and the velocity of its rotation is decreased.

In the form of the invention disclosed in Figures 22, 23 and 24, a slag runner 106 is supported by spaced parallel channel members or beams 68 which are, in turn, secured to spaced grooved rings or annular members 107 by suitable brackets or straps 108. Each ring 107 is provided with a peripheral annular groove 109 for the reception of an annular track or support 110, which is preferably formed of semi-circular sections that have offset overlapping ears 111 which are united by bolts 112, or other suitable securing members, to form a composite ring or track. An annular rack 113 is preferably carried by each groove ring 107, and the teeth of each rack 113 mesh with similar teeth formed on a pinion 115 which is driven by an electric motor 116, or other suitable driving mechanism. Each motor 116 is supported by a bracket 117 carried by each annular track 110.

The annular tracks 110 are swingably supported at longitudinally-aligned points above the slag runner from rotatably-supported hangers or clevices 118 by chains 119, or other suitable suspending members. A link 120 is pivotally connected at one terminal to each track 110, as indicated at 121, and the opposed terminal of each link is pivotally connected, as indicated at 122, to a crank or eccentric 123 which is rotatably driven from an electric motor 125 through a conventional speed reducer 126. The connection between the crank and the link being adjustable, as indicated at 127, in order that the throw of the crank may be varied, and the crank is driven at different speeds, for reasons to be hereinafter explained.

With this arrangement, the slag runner 106 is swung or vibrated about the center of oscillation of the hangers 118, and the frequency and amplitude of the vibratory impulses or swinging movements which are imparted to the supports and slag runner 106 are controlled at such values as to agitate the fluid mass in the slag runner, but to avoid splashing of the molten slag over the upper edges of the slag runner channel. If vibratory impulses of relatively high frequency are to be imparted to the slag runner, the throw of each eccentric 123 is adjusted so that vibratory movements of relatively small amplitude are imparted by the rotation of the cranks. On the other hand, the throw of each crank may be adjusted to impart swinging movement of relatively great amplitude to the slag runner, but in this event, the rotary movement of the crank is slowed to a degree where the molten mass will not spill when the direction of oscillatory movement of the slag runner is reversed, and inasmuch as the rotary crank imparts harmonic motion to the slag runner, this aids in preventing splashing or spilling of the molten slag.

In operation, when the molten slag and entrained metal is flowing through the slag runner 106, each motor is operated to thereby swing or oscillate the channel about the center of support of the hangers 118, and the frequency and amplitude of this movement is controlled, as hereinbefore explained. The arcuate characteristic of the vibratory or swinging movement imparted to the runner 106 introduces a centrifugal component to thus further aid in causing the entrained metal in the flowing molten slag to drop into the pockets in the slag runner.

After the slag run and the solidification of the recovered metal in the pockets of the slag runner, the motors 116 are actuated to thereby rotate the slag runner 106 through an angle of 180 degrees, so that the solidified recovered metal may be ejected from the slag runner, in the manner hereinbefore disclosed.

Figures 25 and 26 depict a form of my invention in which a slag runner 130 is secured to spaced annular supports or rings 131 by suitable brackets 132, and each ring has an annular groove 133 formed in the peripheral portion thereof. Each ring 131 is rotatably supported on groove rollers 135, so that the slag runners 130 may be rotated about the axes of the rings 131 from slag-receiving position to metal-ejecting position. A chain or other flexible member 136 is received within the groove 133 of each ring 131, and a link, or portion of the chain, is secured to the ring 131 by a screw or other suitable securing device, as indicated at 137. Each chain 136 is trained around each ring 131 and around a sprocket 138 supported on a shaft 140 that is rotatably supported in suitable bearings 141, which are, in turn, supported by any suitable structure, not completely shown. A conventional hoist or winch 142 is supported at one side of the shaft 140, and its cable 143 is secured to one reach of the chain, as indicated at 145. A similar winch or hoist 146 is supported at the opposed side of shaft 140, and its cable is secured to the opposed reach of the chain 136, as indicated at 147.

By this arrangement, the molten slag is conveyed through the slag runner, in a manner hereinbefore disclosed, and as the molten slag flows through the runner the entrained metal is trapped in the metal-receiving pockets formed in the runner. After the slag run, the recovered metal in the slag runner pockets is solidified, and this metal may be readily ejected by actuating the hoist or winch 142 to thus pull upwardly on the reach of chain 136 to which this hoist is connected until the rings 131 and slag runner 130 have been rotated through an angle of 180 degrees. In this position, the solidified recovered metal is ejected, and now the slag runner 130 may be returned to its original position by actuating the hoist or winch 146, which draws upwardly on the opposed reach of the chain to thereby rotate the rings 131 and slag runner 130 in the opposed direction, until the original position of the slag runner is resumed.

Although this invention has been illustrated as applied to a conventional iron-producing blast furnace, it is to be understood, of course, that the improved runners may be employed advantageously in recovering any metal that is entrained in fluid slag.

It will be understood that the invention herein disclosed may be embodied in other specific forms without departing from the spirit or essential attributes thereof, and it is therefore desired that the present embodiment be considered in all respects as illustrative and not restrictive, reference being had to the claims rather than to the foregoing description to indicate the scope of the invention.

What I now claim as new and useful is:

1. The method of recovering metal from molten slag as it flows from a blast furnace, which consists in flowing the fluid slag and entrained metal along an elongated confined path of travel located over a plurality of metal-receiving pockets, agitating the fluid slag by frequent and abrupt changes of direction of its flow along the path and also subjecting the fluid slag to vibratory impulses as it flows along the said path whereby the relatively heavy entrained metal gravitates into the pockets.

2. The method of recovering metal from molten slag as it flows from a blast furnace, which consists in flowing the fluid slag and entrained metal along an elongated confined path of travel located over a plurality of metal-receiving pockets, agitating the fluid slag by subjecting separate masses of it to independent vibratory impulses at different longitudinally-spaced stages of its travel along the path whereby the entrained relatively heavy metal gravitates into the pockets.

3. The method of recovering metal from molten slag as it flows from a blast furnace, which consists in flowing the fluid slag and entrained metal along an elongated confined path of travel located over a plurality of metal-receiving pockets, agitating the fluid slag by frequent changes of direction of its flow along the path, and subjecting separate masses of the fluid slag to independent vibratory impulses at different longitudinally-spaced stages as it travels along the path whereby the entrained relatively heavy metal gravitates into the pockets.

4. In a metal separator, an elongated slag runner having a channel extending longitudinally throughout its length through which flows molten slag containing molten metal, a plurality of metal-receiving pockets formed in the runner and located below and communicating with the channel, and means for rotatably supporting the slag runner whereby the runner may be rotated sufficiently to invert the said pockets.

5. In a metal separator, an elongated slag runner having a channel extending longitudinally throughout its length through which flows molten slag containing molten metal, a plurality of pockets formed in the runner and located below and communicating with the channel to receive molten metal therein by the action of gravity as the molten slag flows over the pockets, means for rotatably supporting the runner whereby it may be rotated to invert the pockets to discharging position, and means for ejecting the metal from the pockets.

6. In a metal separator, an elongated slag runner having a channel extending longitudinally throughout its length through which flows molten slag containing molten metal, a plurality of metal-receiving pockets formed in the runner and located below and communicating with the channel, means for rotatably supporting the slag runner, and means for rotating the slag runner to invert the metal-receiving pockets.

7. In a metal separator, an elongated slag runner having a plurality of communicating alternatively narrow and wide channels extending longitudinally throughout its length through which flows molten slag containing molten metal whereby the fluid depth of the flowing molten slag changes as the slag flows from a channel of given width into a channel of different width, a plurality of pockets formed in the runner and located below and communicating with the channels to receive molten metal from the flowing slag by the action of gravity, and means for rotatably supporting the runner whereby it may be rotated to invert the pockets to discharge the metal therefrom.

8. In a metal separator, an elongated slag runner having a plurality of communicating alternatively narrow and wide channels extending longitudinally throughout its length through which flows molten slag containing molten metal whereby the fluid depth of the flowing molten slag changes as the slag flows from a channel of given width into a channel of different width, a plurality of pockets formed in the runner and located below and communicating with the channels to receive molten metal from the flowing slag by the action of gravity, means for rotatably supporting the runner, means for rotating the runner to invert the pockets, and means for ejecting solidified metal from the pockets.

9. In a metal separator, an elongated slag runner having a channel extending longitudinally throughout its length through which flows molten slag containing metal of greater specific gravity than the slag, the channel being of sinuous configuration to frequently change the direction of flow of the fluid slag in the runner, a plurality of pockets formed in the runner and located below the channel and communicating therewith to receive molten metal from the flowing slag by the action of gravity, and means for rotatably supporting the runner to invert the pockets to discharge the metal therefrom.

10. In a metal separator, an elongated slag runnner having a channel extending longitudinally throughout its length through which flows molten slag containing metal of greater specific gravity than the slag, the channel being of sinuous configuration to frequently channel the direction of flow of the fluid slag in the runner, a plurality of pockets formed in the runner and located below the channel and communicating therewith to receive molten metal from the flowing slag by the action of gravity, means for rotatably supporting the runner, and means for rotating the runner to invert the pockets to discharge the metal therefrom.

11. In a metal separator, an elongated composite slag runner formed of a plurality of runner sections and having a channel extending longitudinally throughout the length of the runner and through which flows molten slag containing molten metal of greater specific gravity than the slag, each runner section having a recess formed therein of arcuate configuration and disposed in directional oppositions to the arcuate recess of an adjacent runner section to impart sinuous configuration to the runner channel to thereby frequently change the direction of flow of the fluid slag in the runner, a plurality of pockets formed in the runner and located below the channel and communicating therewith to receive molten metal from the flowing slag by the action of gravity, and means for rotatably supporting the runner whereby the runner may be rotated to invert the pockets to discharge the metal therefrom.

12. A slag runner formed of separate runner sections each having a concave wall located at one side thereof and a convex wall located at its opposite side to define an arcuate recess therebetween, means for uniting the runner sections in abutting relation with the concave wall of one runner section abutting the convex wall of the adjacent runner section whereby the arcuate recesses of the united runner sections define a sinuous channel extending throughout the length of the composite runner, and metal-receiving pockets formed in the runner sections below the channel.

13. A slag runner formed of a plurality of similar interchangeable runner sections each having a concave wall located at one side thereof and a convex wall located at its opposite side to define an arcuate recess therebetween with the midpoint of the recess located at one side of the midpoint of the runner section, means for uniting the runner sections in abutting relation with the concave wall of one runner section abutting the convex wall of the adjacent runner section whereby the arcuate recesses of the united runner sections define a sinuous channel extending throughout the length of the composite runner, and metal-receiving pockets formed in the runner sections below the channel.

14. In a metal separator, spaced parallel supporting members, supporting rings secured to the supporting members, a plurality of runner sections each having an inclined concave wall located at one side thereof and an inclined convex wall located at its opposite side to define an inclined arcuate recess therebetween, the runner sections being supported by the supporting members in abutting relation with the concave wall of one runner section abutting the convex wall of the adjacent runner section whereby the arcuate recesses of the abutting runner sections define a sinuous channel extending throughout the length of the composite runner, metal-receiving pockets formed in the sections below the channel, and means for rotating the rings to invert the composite runner.

15. In a metal separator, an elongated slag runner having a channel extending longitudinally throughout its length through which flows molten slag containing molten metal, a plurality of pockets formed in the runner and located below and communicating with the channel to receive molten metal therein by the action of gravity as the molten slag flows over the pockets, means for rotatably supporting the runner whereby it may be rotated to invert the pockets to discharging position, and means for suspending the said runner supporting means.

16. In a metal separator, an elongated slag runner having a channel extending longitudinally throughout its length through which flows molten slag containing molten metal, a plurality of pockets formed in the runner and located below and communicating with the channel to receive molten metal therein by the action of gravity as the molten slag flows over the pockets, means for rotatably supporting the runner whereby it may be rotated to invert the pockets to discharging position, means for suspending the said runner supporting means, and means for swinging the suspended runner and said supporting means.

17. In a metal separator, supporting rings, an elongated slag runner supported by the rings and having a channel extending longitudinally throughout its length through which flows molten slag containing molten metal, a plurality of metal-receiving pockets formed in the runner below and communicating with the channel, and means for rotating the supporting rings to invert the runner and metal-receiving pockets.

18. In a metal separator, a plurality of runner sections each having a recess formed therein, means for supporting the runner sections in abutting relation to form an elongated runner with the recesses of the sections communicating to form a channel which extends longitudinally through the runner, a plurality of metal-receiving pockets formed in the runner below the channel and communicating therewith, and means for rotatably supporting the runner whereby it may be rotated sufficiently to invert the said pockets.

19. In a metal separator, spaced parallel supporting members, a plurality of runner sections each having a recess formed therein and supported by the supporting members in abutting relation to form an elongated runner with the recesses of the sections communicating to form a channel which extends longitudinally through the runner, a plurality of metal-receiving pockets formed in the runner below the channel and communicating therewith, and means for rotatably supporting the runner whereby it may be rotated sufficiently to invert the said pockets.

20. In a metal separator, spaced parallel supporting members, supporting rings secured to the supporting members, a plurality of runner sections each having a recess formed therein and supported by the supporting members in abutting relation to form an elongated runner with the recesses of the sections communicating to form a channel which extends longitudinally through the runner, a plurality of metal-receiving pockets formed in the runner below the channel and communicating therewith, and means for rotating the rings to invert the runner and metal-receiving pockets.

21. In a metal separator, a plurality of separate runner sections each having a recess formed therein, means for movably supporting the runner sections in abutting relation to form an elongated runner with the recesses of the sections communicating to form a channel which extends longitudinally through the runner, a plurality of metal-receiving pockets formed in the runner below the channel and communicating therewith, means to laterally move or vibrate a runner section relative to the other sections, and means for rotatably supporting the runner whereby it may be rotated sufficiently to invert the said pockets.

22. In a metal separator, an elongated slag runner having a plurality of communicating alternatively narrow and wide channels extending longitudinally throughout its length through which flows molten slag containing molten metal whereby the fluid depth of the flowing slag changes as the slag flows from a channel of given width into a channel of different width, and a plurality of pockets formed in the runner and located below and communicating with the channels to receive molten metal from the flowing slag by the action of gravity.

23. In a metal separator, an elongated slag runner having a channel extending longitudinally throughout its length through which flows molten slag containing metal of greater specific gravity than the slag, the channel being of sinuous configuration to frequently change the direction of flow of the fluid slag in the runner, a plurality of pockets formed in the runner and located below the channel and communicating therewith to receive molten metal from the flowing slag by the action of gravity.

24. In a metal separator, an elongated composite slag runner formed of a plurality of runner sections and having a channel extending longitudinally throughout the length of the runner and through which flows molten slag containing molten metal of greater specific gravity than the slag, each runner section having a recess formed therein of arcuate configuration and disposed in directional oppositions to the arcuate recess of an adjacent runner section to impart sinuous configuration to the runner channel to thereby frequently change the direction of flow of the fluid slag in the runner, and a plurality of pockets formed in the runner and located below the channel and communicating therewith to receive molten metal from the flowing slag by the action of gravity.

25. In a metal separator, an elongated composite slag runner formed of a plurality of runner sections and having a channel extending longitudinally throughout the length of the runner and through which flows molten slag containing molten metal of greater specific gravity than the slag, spaced parallel supports, each runner section being supported by the supports and having a recess formed therein of arcuate configuration and disposed in directional opposition to the arcuate recess of an adjacent runner section to impart sinuous configuration to the runner channel to thereby frequently change the direction of flow of the fluid slag in the runner, a plurality of pockets formed in the runner and located below the channel and communicating therewith to receive molten metal from the flowing slag by the action of gravity.

26. In a metal separator, a plurality of separate runner sections each having a recess formed therein, means for movably supporting the runner sections in abutting relation to form an elongated runner with the recesses of the sections communicating to form a channel which extends longitudinally through the runner, a plurality of metal-receiving pockets formed in the runner below the channel and communicating therewith, and means to laterally move or vibrate a runner section relative to the other sections.

27. As an article of manufacture, a slag runner section including a body portion defining a slag-receiving recess, opposed supporting flanges extending outwardly from the body portion to engage suitable supports, and a metal-receiving recess formed in the body portion below and in communication with the said recess.

HARRY J. LOVE.